(12) United States Patent
Saito et al.

(10) Patent No.: US 9,709,958 B2
(45) Date of Patent: Jul. 18, 2017

(54) STEPPING MOTOR AND TIMEPIECE

(71) Applicant: CASIO COMPUTER CO., LTD., Shibuya-ku, Tokyo (JP)

(72) Inventors: Yuta Saito, Kokubunji (JP); Hiroyuki Hosobuchi, Iruma (JP); Junro Yano, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 378 days.

(21) Appl. No.: 14/486,639

(22) Filed: Sep. 15, 2014

(65) Prior Publication Data

US 2015/0092522 A1 Apr. 2, 2015

(30) Foreign Application Priority Data

Sep. 27, 2013 (JP) .................................. 2013-201949

(51) Int. Cl.
*H02K 37/00* (2006.01)
*G04C 3/14* (2006.01)
(Continued)

(52) U.S. Cl.
CPC ............... *G04C 3/146* (2013.01); *G04C 3/14* (2013.01); *H02K 21/185* (2013.01); *H02K 37/16* (2013.01);
(Continued)

(58) Field of Classification Search
CPC ................................ H02K 37/14; H02K 3/04
(Continued)

(56) References Cited

U.S. PATENT DOCUMENTS 4,297,838 A * 11/1981 Watanabe .............. G04C 3/008
310/40 MM
5,619,086 A * 4/1997 Steiner ................ H01F 41/0233
242/437.2
(Continued)

FOREIGN PATENT DOCUMENTS

CN 102540862 A 7/2012
JP 52158822 U 12/1977
(Continued)

OTHER PUBLICATIONS

Chinese Office Action (and English translation thereof) dated Jul. 13, 2016, issued in counterpart Chinese Application No. 201410502587.6.
(Continued)

*Primary Examiner* — Hanh Nguyen
(74) *Attorney, Agent, or Firm* — Holtz, Holtz & Volek PC

(57) ABSTRACT

Disclosed is a stepping motor including a rotor, a stator which includes a rotor accommodating hole, a pair of outer notches to determine positions of saturated magnetic fluxes and inner notches disposed on an inner periphery of the stator around the rotor accommodating hole, the inner notches determining stably stationary positions of the rotor, and a coil block configured by a coil wound around a coil core which is magnetically coupled to the stator, and the outer notches are disposed on an outer periphery of the stator on opposite sides of the rotor accommodating hole. And a line that connects narrowest portions between the outer notches and the rotor accommodating hole and extends through a center of the rotor accommodating hole shifts by a predetermined angle from a line that extends through the center of the rotor accommodating hole and is orthogonal to an extending direction of the stator.

6 Claims, 12 Drawing Sheets

(51) Int. Cl.
    *H02K 21/18*    (2006.01)
    *H02K 37/16*    (2006.01)
    H02K 37/14      (2006.01)
    H02K 3/04       (2006.01)
(52) U.S. Cl.
    CPC ............... *H02K 3/04* (2013.01); *H02K 37/14* (2013.01); *H02K 2213/03* (2013.01)
(58) Field of Classification Search
    USPC .................................. 310/49.55; 368/76, 80
    See application file for complete search history.

(56) References Cited

U.S. PATENT DOCUMENTS

| | | | |
|---|---|---|---|
| 6,548,922 B1* | 4/2003 | Takahashi | .............. H02K 37/16 310/49.33 |
| 6,774,513 B2 | 8/2004 | Takahashi et al. | |
| 2012/0170426 A1 | 7/2012 | Honmura et al. | |
| 2014/0071794 A1* | 3/2014 | Yamamoto | ............. G04C 3/143 368/76 |

FOREIGN PATENT DOCUMENTS

| | | | | |
|---|---|---|---|---|
| JP | 5510386 | U | | 7/1978 |
| JP | 63149185 | U | | 9/1988 |
| JP | 2000-295884 | | * 4/1999 | ............. H02K 37/14 |
| JP | 2000134901 | A | | 5/2000 |
| WO | 9964937 | A1 | | 12/1999 |

OTHER PUBLICATIONS

Japanese Office Action (and English translation thereof) dated Sep. 29, 2015, issued in counterpart Japanese Application No. 2013-201949.

* cited by examiner

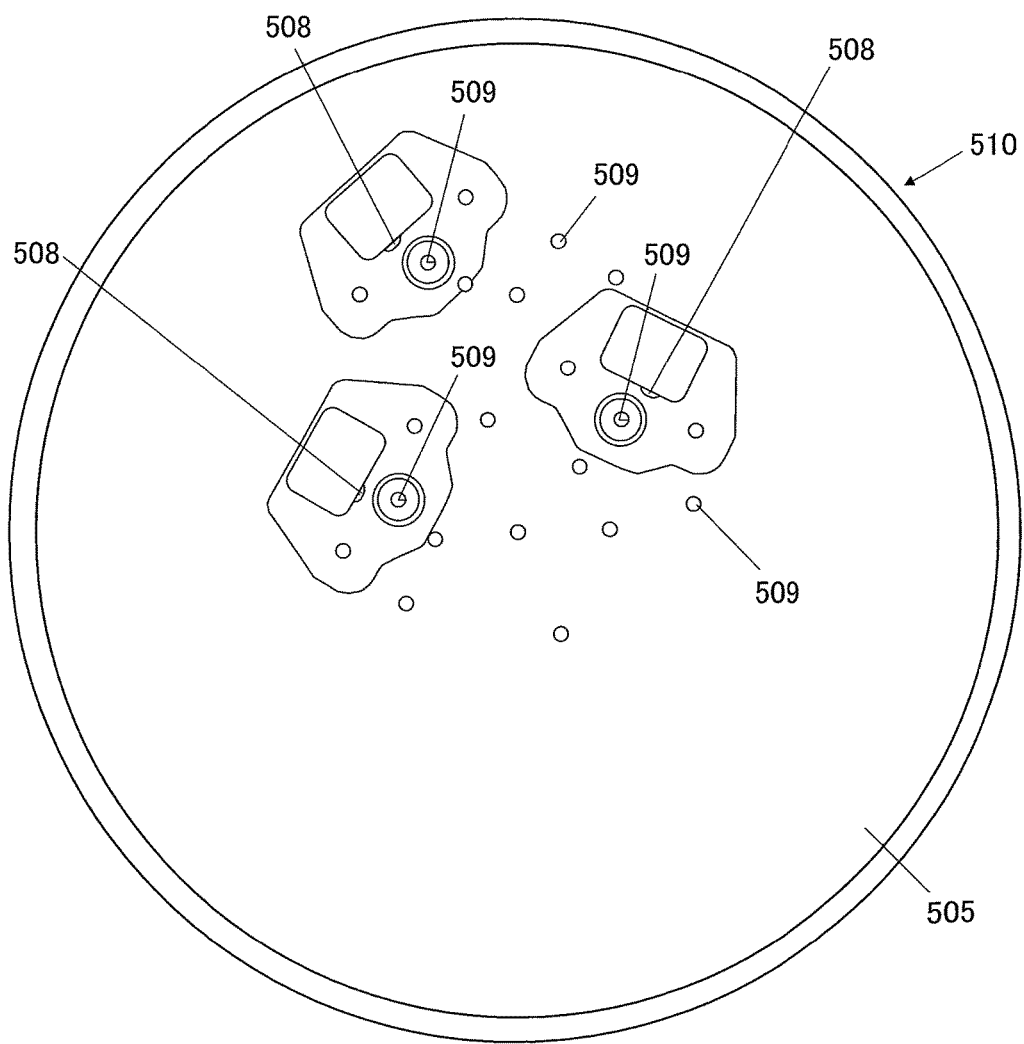

STEPPING MOTOR AND TIMEPIECE

BACKGROUND OF THE INVENTION

1. Field of the Invention

The present invention relates to a stepping motor and a timepiece.

2. Description of Related Art

A stepping motor including a rotor, a stator, and a coil is used to drive various devices.

The stepping motor can rotate the rotor by a predetermined step angle through application of voltage to the coil. Such a stepping motor is widely applied to devices, such as a timepiece including hands (a second hand, a minute hand, and an hour hand), that need to accurately operate by a predetermined amount.

In the invention described in WO99/064937, the stator has a pair of outer notches on a line orthogonal to a linear portion of a coil core provided with a coil, such that the outer notches are disposed on the opposite sides of a rotor accommodating hole for accommodating the rotor. This configuration defines two positions of saturated magnetic fluxes.

The stator also has a pair of inner notches on the inner periphery around the rotor accommodating hole on the substantially opposite sides. The inner notches serve as position determiners for determining positions (stably stationary positions) where the rotor stably stops.

Unfortunately, in such a conventional stepping motor, for example, if the inner notches are provided around the rotor accommodating hole so as to stop the rotor at an angle of approximately 45° from the positions of saturated magnetic fluxes, the stator has narrow portions adjacent to the positions of saturated magnetic fluxes.

The magnetic fluxes generated from the coil core flow to the narrow portions before reaching the positions of saturated magnetic fluxes in the stator, so that the magnetic fluxes are readily saturated at the narrow portions. This configuration causes energy loss.

In general, a motor should be further miniaturized to be installed in a small electronic device such as a wristwatch. Unfortunately, the miniaturization of the motor further narrows the narrow portions to accelerate saturation of the magnetic fluxes at the narrow portions. The energy loss accordingly increases.

SUMMARY OF THE INVENTION

An object of the invention, which has been accomplished on the above background, is to provide a stepping motor causing less energy loss even if the motor is miniaturized and a timepiece including the motor.

In order to achieve the above objects, one aspect of the present invention is a stepping motor including a rotor, a stator which includes a rotor accommodating hole to accommodate the rotor, a pair of outer notches to determine positions of saturated magnetic fluxes and inner notches disposed on an inner periphery of the stator around the rotor accommodating hole, the inner notches determining stably stationary positions of the rotor, and a coil block configured by a coil wound around a coil core which is magnetically coupled to the stator, and the outer notches are disposed on an outer periphery of the stator on opposite sides of the rotor accommodating hole, and a line that connects narrowest portions between the outer notches and the rotor accommodating hole and extends through a center of the rotor accommodating hole shifts by a predetermined angle from a line that extends through the center of the rotor accommodating hole and is orthogonal to an extending direction of the stator.

In order to achieve the above objects, another aspect of the present invention is a timepiece including a stepping motor which includes a rotor, a stator having a rotor accommodating hole to accommodate the rotor, a pair of outer notches to determine positions of saturated magnetic fluxes and inner notches disposed on an inner periphery of the stator around the rotor accommodating hole, the inner notches determining stably stationary positions of the rotor, and a coil block configured by a coil wound around a coil core which is magnetically coupled to the stator, hands, and a gear train mechanism which is coupled with the hands and which is driven by rotation of the stepping motor, and in the stepping motor, the outer notches are disposed on an outer periphery of the stator on opposite sides of the rotor accommodating hole, and a line that connects narrowest portions between the outer notches and the rotor accommodating hole and extends through a center of the rotor accommodating hole shifts by a predetermined angle from a line that extends through the center of the rotor accommodating hole and is orthogonal to an extending direction of the stator.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 8 is a plan view of the timepiece in FIG. 6 that excludes the stepping motors;

DESCRIPTION OF THE PREFERRED EMBODIMENTS

First Embodiment

A stepping motor according to a first embodiment of the invention and a timepiece including the stepping motor will now be described with reference to FIGS. 1A, 1B to FIG. 8. Although the following description includes various limitations to describe technically preferred embodiments of the invention, the invention should not be limited to the embodiments and the illustrated examples.

Figure 1A:
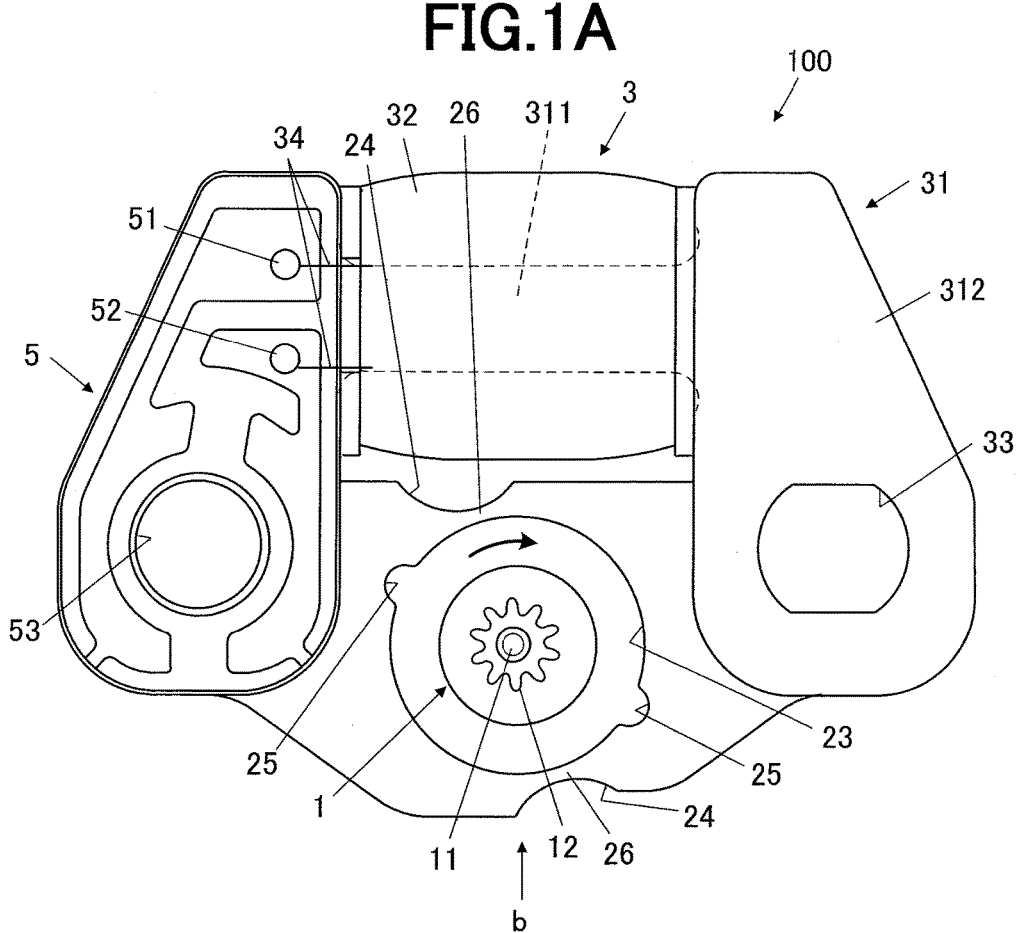
FIG. 1A is a front view of a stepping motor according to a first embodiment where a rotor thereof rotates clockwise.
Figure 1B:
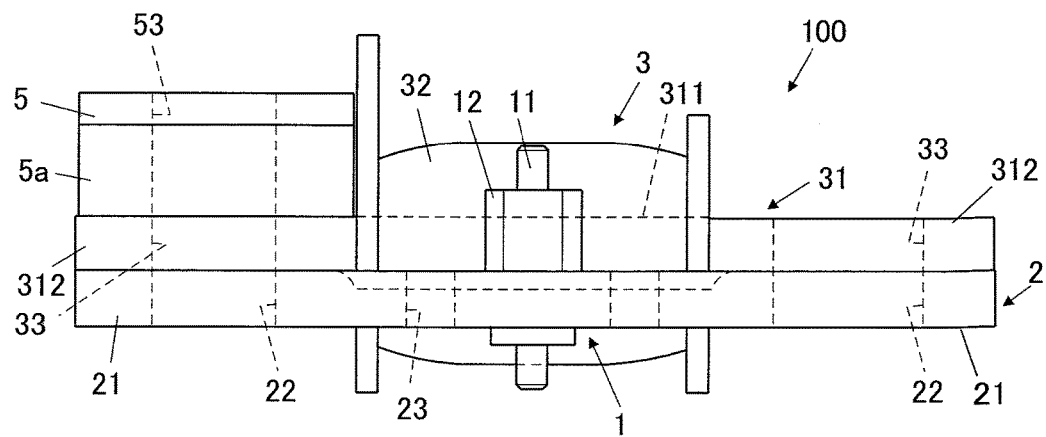
FIG. 1B is a side view of the stepping motor when seen in the direction of an arrow b in FIG. 1A.

FIG. 1A is a plan view of a stepping motor according to the first embodiment, and FIG. 1B is a side view of the stepping motor when seen in the direction of the arrow b in FIG. 1A.

Figure 6:
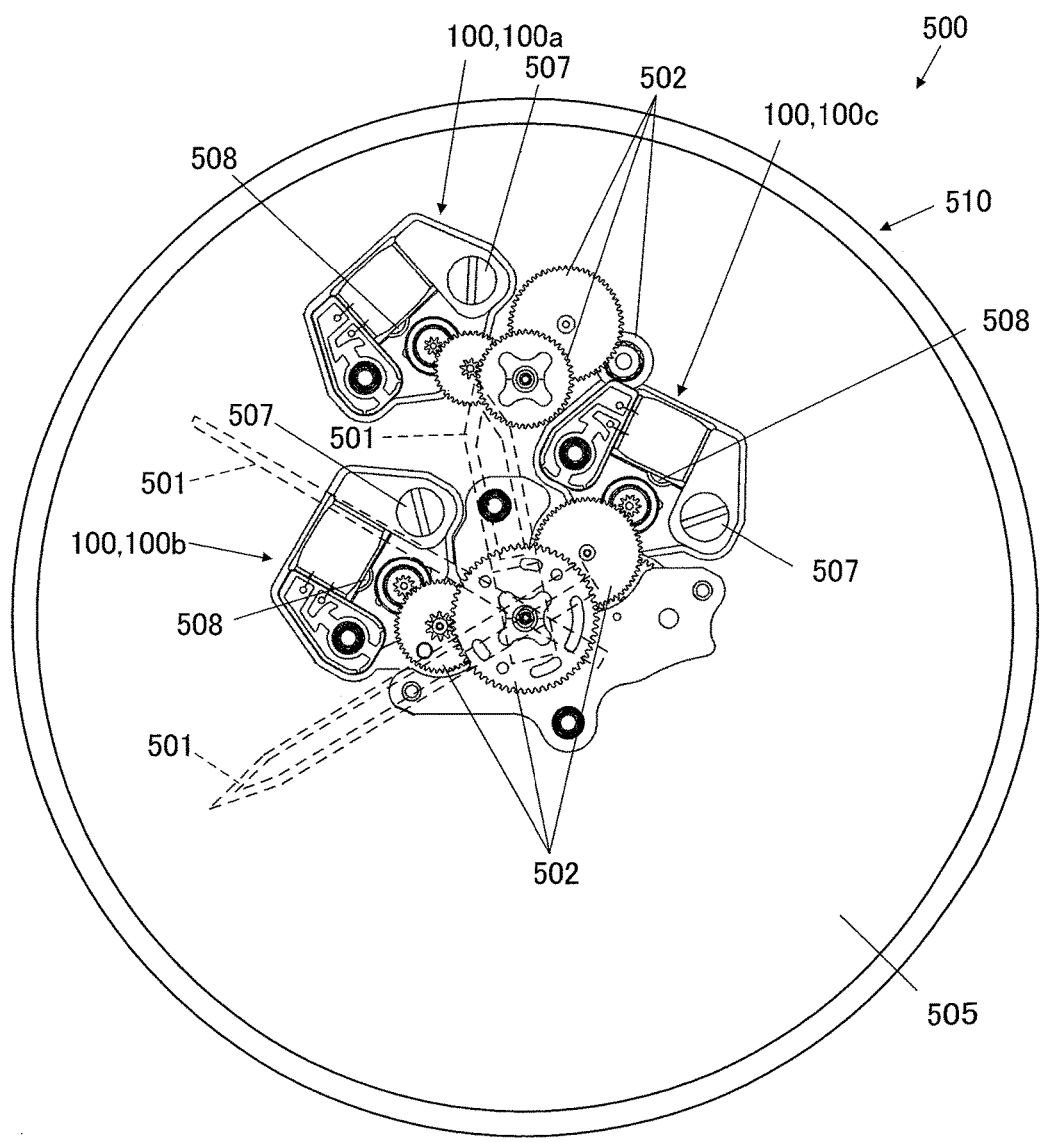
FIG. 6 is a schematic plan view of a timepiece including stepping motors according to the first embodiment in an exemplary arrangement.

The stepping motor 100 according to the embodiment is a small motor to drive, for example, a date indicating mechanism or a hand driving mechanism for driving hands 501 (e.g., a second hand, a minute hand, and an hour hand) in a timepiece 500 (refer to FIG. 6).

With reference to FIGS. 1A and 1B, the stepping motor 100 includes a rotor 1, a stator 2, and a coil block 3 magnetically coupled to the stator 2.

With reference to FIG. 1A, the rotor 1 according to the embodiment is composed of a disk or cylindrical magnet having a substantially circular shape as viewed from above.

The rotor 1 is bipolarly-magnetized into the south pole and the north pole in the radial direction.

Although the rotor 1 should preferably be composed of a permanent magnet, such as a rare-earth magnet (e.g., a samarium-cobalt magnet), the rotor 1 may be composed of any other magnet.

The rotor 1 is provided with a rotary shaft 11 in the center.

The rotor 1 is accommodated in a rotor accommodating hole 23 (described below) of the stator 2 such that the rotor 1 is rotatable around the rotary shaft 11. According to the embodiment, under driving pulses applied to a coil 32 (described below), the rotor 1 can rotate by a predetermined step angle inside the rotor accommodating hole 23.

The rotary shaft 11 is provided with a pinion 12. The pinion 12 engages with, for example, gears 502 (refer to FIG. 6) constituting a gear train mechanism for driving the hands 501 of the timepiece 500, such that the gears 502 engaging with the pinion 12 rotate with the rotor 1.

Figures 2A, 2B:
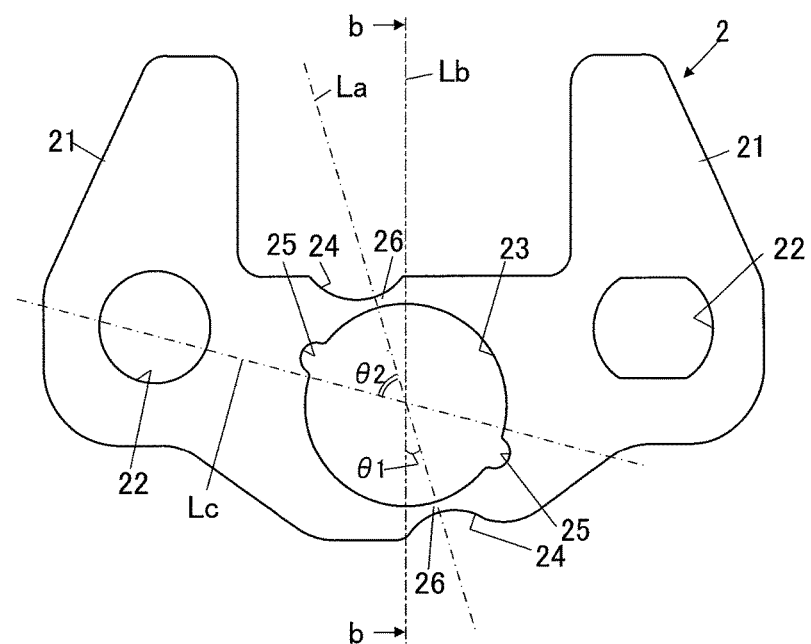
FIG. 2A is a plan view of a stator according to the first embodiment.
FIG. 2B is a cross-sectional view of the stator cut along a line b-b in FIG. 2A.

FIG. 2A is a plan view of the stator according to the embodiment, and FIG. 2B is a cross-sectional view of the stator cut along the line b-b in FIG. 2A.

The stator 2 according to the embodiment is composed of a highly magnetically permeable material such as a permalloy. In specific, the stator 2 is composed of Permalloy B (PB), for example.

Permalloy B contains Ni (45%) and Fe (bal.), and has an initial magnetic permeability of 60,000 µi, a maximum magnetic permeability of 180,000 µm, a saturation flux density of 0.65 Bm(T), a magnetic coercive force of 1.2 Hc (A/m), and a specific resistance of 0.55 µΩ·m or higher. Permalloy B has a relatively low saturation flux density and thus is readily saturated with a magnetic flux.

The stator 2 may be composed of any material other than Permalloy B.

With reference to FIGS. 1A and 2A, the stator 2 is a plate-like member extending in the extending direction of the stepping motor 100 (i.e., the lateral direction in FIG. 1A or 2A, or the extending direction of a linear portion 311 of a coil core 31 provided with a coil 32 (described below)).

The stator 2 includes stator-side couplers 21 on both ends, which constitute couplers magnetically coupled to the coil core 31 (described below). The stator-side couplers 21 extend in the same direction orthogonal to the extending direction of the stator 2 (i.e., the lateral direction in FIG. 1A or 2A, or the extending direction of the linear portion 311 of the coil core 31). The stator-side couplers 21 have shapes that substantially match the shapes of respective coil-side couplers 312 of the coil core 31.

The stator-side couplers 21 each may have a screw hole 22. The screw holes 22 are disposed at substantially the same distance from the center of the stator 2 in its extending direction (i.e., symmetrically in the lateral direction in FIG. 1A or 2A). One of the screw holes 22 should preferably be an elongated hole for precise assembly.

The stator 2 according to the embodiment has a substantially identical thickness at both sides of the stator 2 in its extending direction (i.e., the right and left in FIG. 1A or 2A).

With reference to FIGS. 2A and 2B, the stator 2 has a rotor accommodating hole 23 for accommodating the rotor 1, a pair of outer notches 24 for determining the positions of saturated magnetic fluxes, and inner notches 25 for determining stably stationary positions of the rotor 1.

The rotor accommodating hole 23 according to the embodiment is a substantially circular opening disposed at the substantial center of the stator 2 in its extending direction (i.e., the lateral direction in FIG. 1A or 2A, or the extending direction of the linear portion 311 of the coil core 31 in the embodiment).

In the stator 2 according to the embodiment, the stator-side couplers 21 and the screw holes 22 are substantially symmetrically disposed in the extending direction of the stator 2 (lateral direction in FIG. 1A or 2A) on both sides of the rotor accommodating hole 23. The entire stator 2 has a substantially symmetrical shape and a substantially identical thickness at the right and left sides of the rotor accommodating hole 23 (the right and left in FIG. 1A or 2A).

The outer notches 24 are disposed on the outer periphery of the stator 2 on the opposite sides of the rotor accommodating hole 23, such that the line that connects the respective narrowest portions between the outer notches 24 and the rotor accommodating hole 23 and extends through the center of the rotor accommodating hole 23 shifts by a predetermined angle ($\theta 1$ in FIG. 2A) from the line that extends through the center of the rotor accommodating hole 23 and is orthogonal to the extending direction of the stator 2 (i.e., the lateral direction in FIG. 1A or 2A, or the extending direction of the linear portion 311 of the coil core 31 in the embodiment).

The predetermined angle $\theta 1$, i.e., the angle defined by how much the line (La in FIG. 2A) that connects the respective narrowest portions between the outer notches 24 and the rotor accommodating hole 23 and extends through the center of the rotor accommodating hole 23 is shifted from the line (Lb in FIG. 2A) that extends through the center of the rotor accommodating hole 23 and is orthogonal to the extending direction of the stator 2 should preferably range from approximately 10° to 25°, depending on the size of the stepping motor 100 and the width of the stator 2. According to the embodiment, the predetermined angle θ1 is approximately 17°.

The outer notches 24 each may have any shape and any size other than the illustrated example.

Portions 26 of the stator 2 between the respective outer notches 24 and the rotor accommodating hole 23 have narrower widths than that of the other portions, so that the magnetic fluxes can be more readily saturated at the portions 26 compared to the other portions.

The portions 26 are configured so as to be at positions of saturated magnetic fluxes where they are not saturated with the magnetic fluxes from the rotor 1 but saturated with the excited coil 32 (described below) to have increased magnetic resistance.

The two inner notches 25 are disposed on the inner periphery of the rotor accommodating hole 23 on the substantially opposite sides.

The inner notches 25 constitute position determiners for determining positions (stably stationary positions) where the rotor 1 stably stops.

The rotor 1 is attracted by the nearest metal; hence, the largest holding torque occurs in the stepping motor 100 when the two magnetic poles of the rotor 1 face the portions of the stator 2 other than the inner notches 25, i.e., the pole boundary positions (the ends of the boundary between the magnetic poles) of the rotor 1 face the respective inner notches 25. The rotor 1 thus stops its rotation at a magnetically stable position where the pole boundary positions of the rotor 1 face the respective inner notches 25, under no driving pulse applied to the coil 32 (described below) in a non-energized state.

The inner notches 25 according to the embodiment are disposed such that the line that connects the bottoms of the respective inner notches 25 and extends through the center of the rotor accommodating hole 23 shifts by a predetermined angle (θ2 in FIG. 2A) from the line that connects the respective narrowest portions between the outer notches 24 and the rotor accommodating hole 23 and extends through the center of the rotor accommodating hole 23.

The predetermined angle θ2, i.e., the angle defined by how much the line (Lc in FIG. 2A) that connects the bottoms of the respective inner notches 25 and extends through the center of the rotor accommodating hole 23 is shifted from the line (La in FIG. 2A) that connects the respective narrowest portions between the outer notches 24 and the rotor accommodating hole 23 and extends through the center of the rotor accommodating hole 23 should preferably range from approximately 30° to 50°, depending on various conditions such as the specification of the stepping motor 100. According to the embodiment, the predetermined angle θ2 is approximately 45°.

The inner notches 25 each may have any shape and any size other than the illustrated example.

The stator 2 according to the embodiment has a substantially symmetrical shape and a substantially identical thickness at both sides of the rotor accommodating hole 23 in the extending direction of the stator 2 (the right and left in FIG. 1A or 2A), as described above.

Figure 3A:
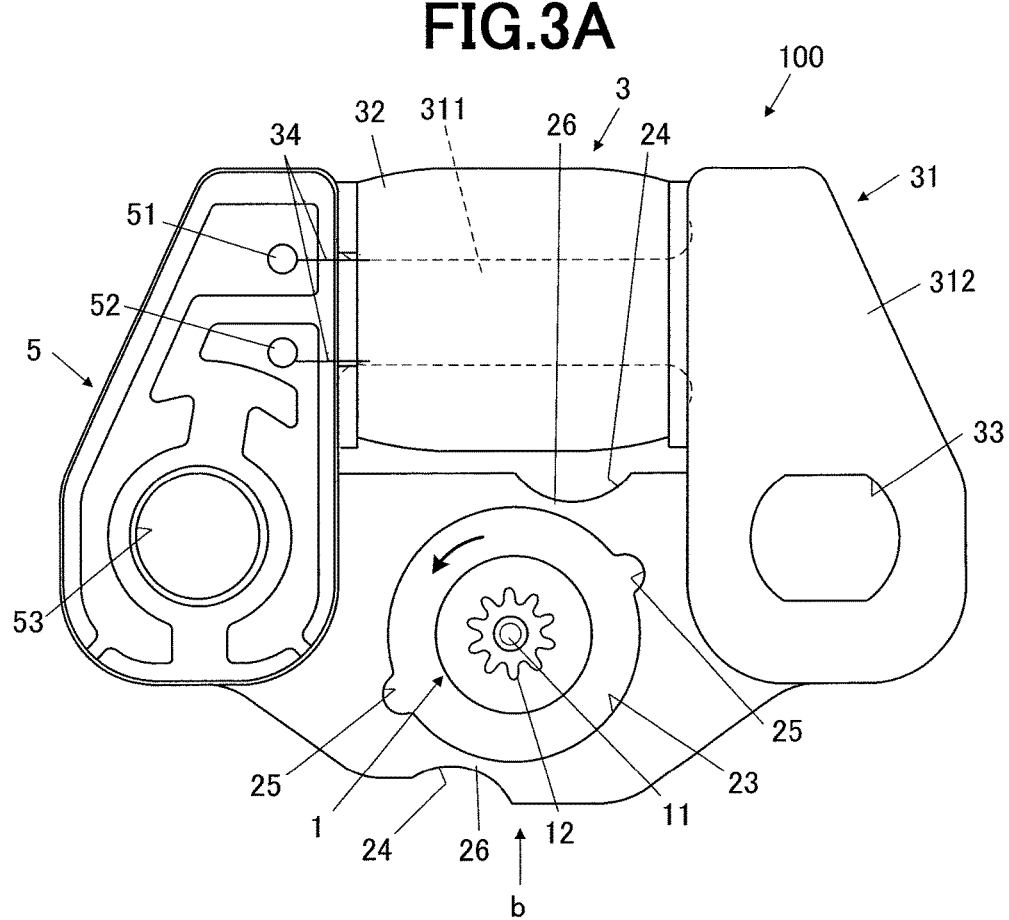
FIG. 3A is a front view of the stepping motor in FIG. 1A where the rotor thereof rotates counterclockwise.
Figure 3B:
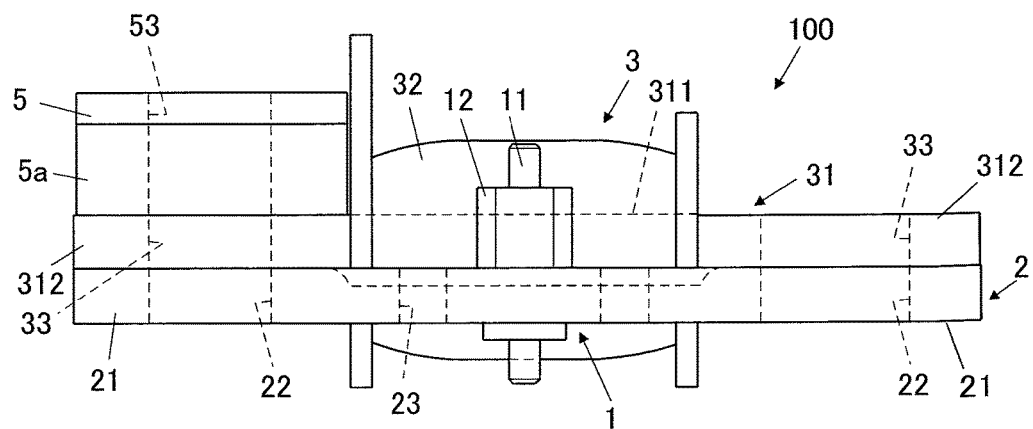
FIG. 3B is a side view of the stepping motor when seen in the direction of an arrow b in FIG. 3A.

The stator 2 can thus be provided with the coil block 3 even if the stator 2 is reversed front to back, as illustrated in FIGS. 3A and 3B.

For example, in order to rotate the rotor 1 clockwise (as illustrated with an arrow in FIG. 1A), the stator 2 is disposed such that the outer notches 24 reside at upper-left and lower-right positions, and then is provided with the coil block 3, as illustrated in FIG. 1A.

In order to rotate the rotor 1 counterclockwise (as illustrated with an arrow in FIG. 3A), the stator 2 is disposed such that the outer notches 24 reside at upper-right and lower-left positions, and then is provided with the coil block 3, as illustrated in FIG. 3A.

According to the embodiment, the mere reversal of the identical stator 2 can reverse the rotational direction of the rotor 1.

Figure 4A:
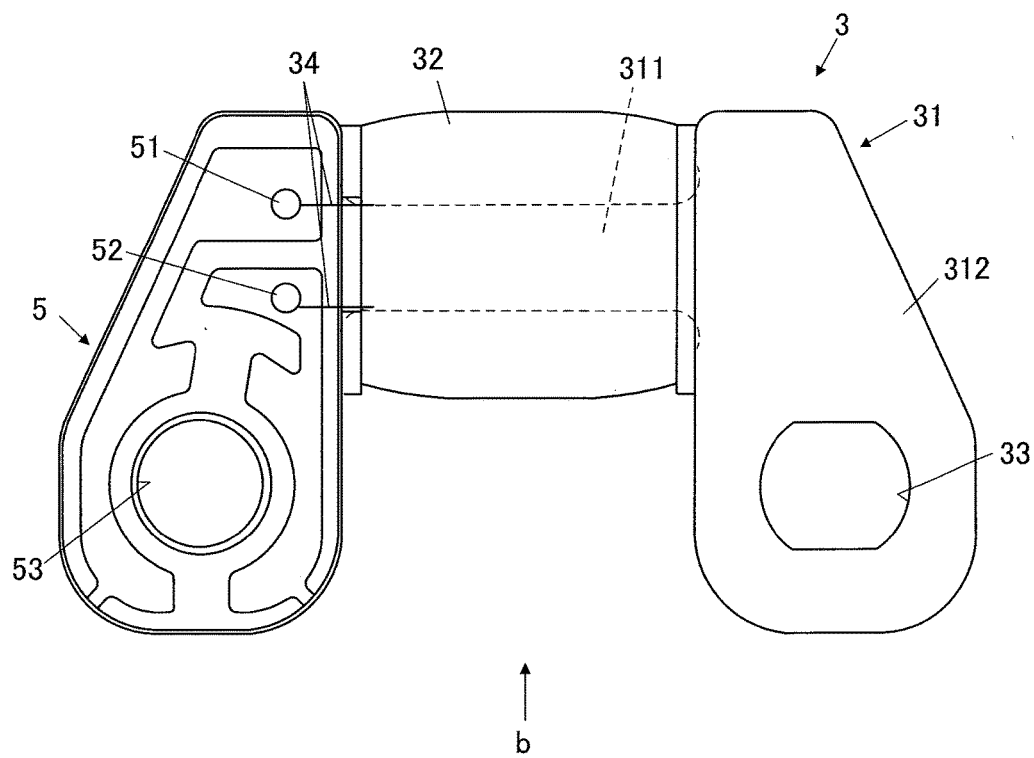
FIG. 4A is a front view of a coil block according to the first embodiment.
Figure 4B:
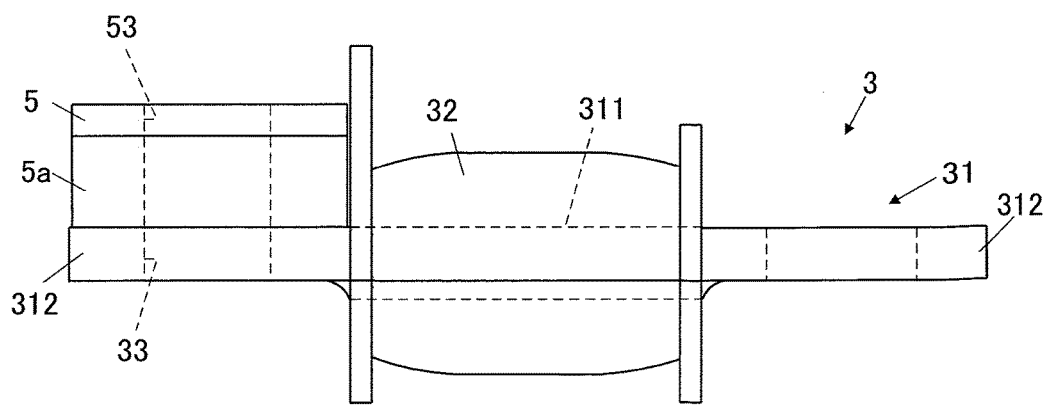
FIG. 4B is a side view of the coil block when seen in the direction of an arrow b in FIG. 4A.

FIG. 4A is a plan view of the coil block 3 according to the embodiment, and FIG. 4B is a side view of the coil block 3 when seen in the direction of the arrow b in FIG. 4A.

With reference to FIGS. 4A and 4B, the coil block 3 includes a coil core 31 and a coil 32 composed of a wire wound around the coil core 31.

The coil core 31 is composed of a highly magnetically permeable material such as a permalloy. In specific, the coil core 31 is composed of Permalloy C (PC), for example.

Permalloy C contains Ni (77-78%), Mo (5%), Cu (4%), and Fe (bal.), and has an initial magnetic permeability of 4,500 μi, a maximum magnetic permeability of 45,000 μm, a saturation flux density of 1.50 Bm(T), a magnetic coercive force of 12 Hc(A/m), and a specific resistance of 0.45 μΩ·m or higher. Permalloy C is less readily saturated with a magnetic flux compared to Permalloy B constituting the stator 2.

The coil core 31 may be composed of any material other than Permalloy C. In other words, the coil core 31 may be composed of any other highly magnetically permeable material such as ferrite.

Figures 5A, 5B, 5C:
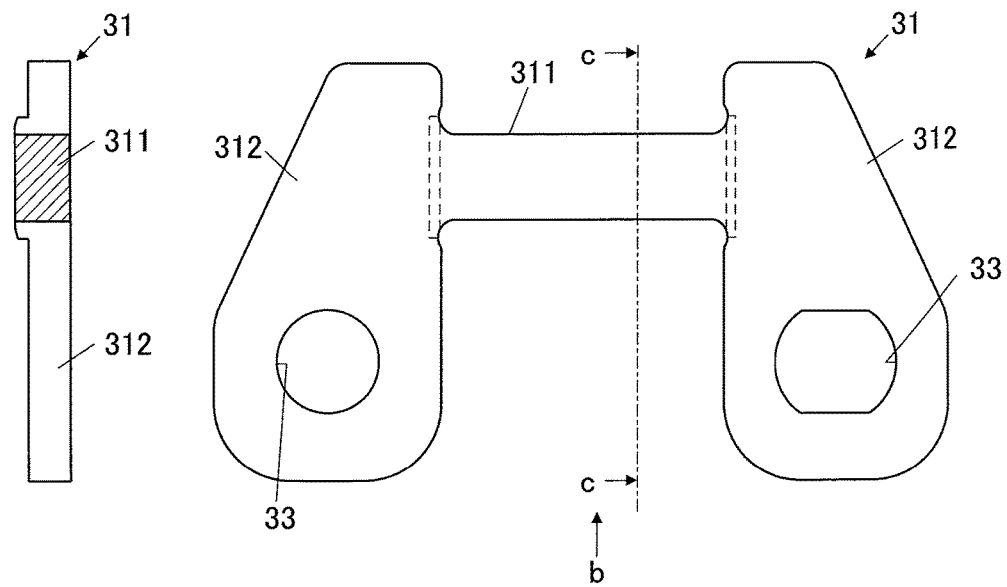
FIG. 5A is a front view of a coil core according to the first embodiment.
FIG. 5B is a side view of the coil core when seen in the direction of an arrow b in FIG. 5A.
FIG. 5C is a cross-sectional view of the coil core cut along a line c-c in FIG. 5A.

FIG. 5A is a plan view of the coil core 31 according to the embodiment, FIG. 5B is a side view of the coil core 31 when seen in the direction of the arrow b in FIG. 5A, and FIG. 5C is a cross-sectional view of the coil core 31 cut along the line c-c in FIG. 5A.

With reference to FIGS. 5A to 5C, the coil core 31 has a linear portion 311 provided with the coil 32 composed of the wound wire, and coil-side couplers 312 disposed at both ends of the linear portion 311.

The linear portion 311 extends in the extending direction of the stator 2 (i.e., the lateral direction in FIG. 1A, 2A, or 5A, or the extending direction of the stepping motor 100) in an assembled state of the stepping motor 100. The linear portion 311 according to the embodiment has a thickness slightly larger than that of the coil-side couplers 312.

The coil-side couplers 312 extend orthogonally to the extending direction of the linear portion 311. The coil-side couplers 312 are disposed over the stator-side couplers 21 of the stator 2 in the assembled stepping motor 100, to constitute the coupled parts magnetically coupled to the stator 2.

The coil-side couplers 312 each have a screw hole 33 at a position corresponding to each of the screw holes 22 of the stator-side couplers 21. One of the screw holes 33 should preferably be an elongated hole for precise assembly.

In the assembled stepping motor 100 according to the embodiment, the screw holes 22 of the stator-side couplers 21 and the screw holes 33 of the coil-side couplers 312 are respectively coupled with screws 507 (refer to FIG. 6).

When the stepping motors 100 are installed into a timepiece case 510 as illustrated in FIG. 6, the screws 507 fix the stepping motors 100 onto a base board 505 (refer to FIG. 6) or a substrate (not shown) provided inside the timepiece case 510 such that the screws 507 couple the respective coil cores 31 to the respective stators 2.

It is noted that the coil core 31 may also be coupled to the stator 2 by any other means. For example, the respective coil cores 31 may be coupled to the respective stators 2 with screws or by welding to assemble the stepping motor 100 unit before the mounting of the finished stepping motor 100 unit onto the base board 505 in the timepiece case 510 with the screws 507.

With reference to FIGS. 4A and 4B, one of the coil-side couplers 312 (the left coil-side coupler 312 in FIG. 4A in the embodiment) is covered with a substrate 5 via a spacer 5a. The spacer 5a adjusts the height of the substrate 5 to that of the coil 32. The thickness of the spacer 5a is appropriately determined depending on the height of the coil 32. The spacer 5a is an optional component and may be omitted.

The substrate 5 is provided with a first coil terminal 51 and a second coil terminal 52 thereon. The first coil terminal 51 and the second coil terminal 52 are connected to wire ends 34 of the coil 32. The coil 32 is connected to a driving pulse supplying circuit (not shown) via the first coil terminal 51 and the second coil terminal 52. Under driving pulses applied from the driving pulse supplying circuit to the coil 32, the coil 32 generates a magnetic flux. The magnetic flux generated in the coil 32 flows from the coil core 31 to the stator 2. This operation appropriately switches the magnetic poles around the rotor accommodating hole 23, so that the rotor 1 rotates by a predetermined step angle (e.g., 180°).

The substrate 5 has a screw hole 53 at a position corresponding to one of the screw holes 22 of the stator-side couplers 21 and one of the screw holes 33 of the coil-side couplers 312. The screws 507 couple the respective stator 2, the respective coil core 31 and the substrate 5 together.

Figure 7:
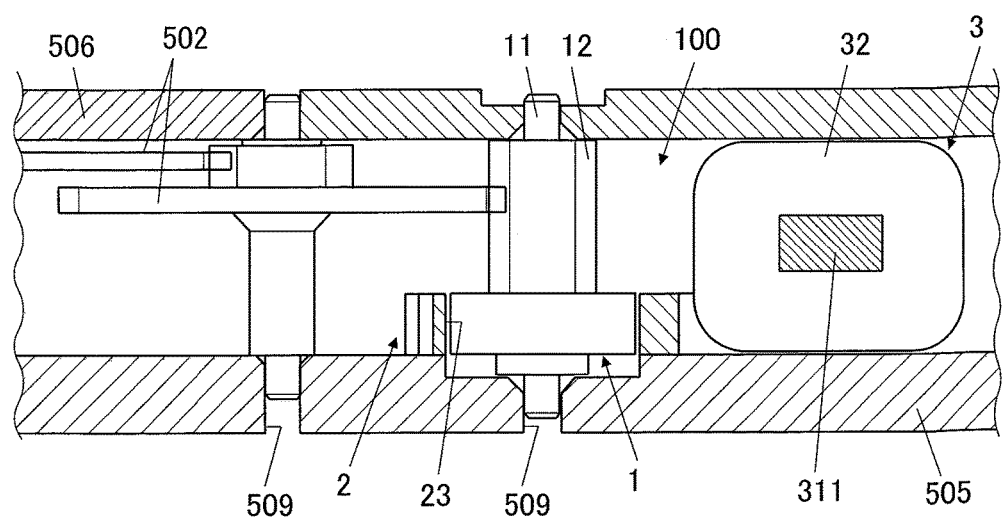
FIG. 7 is a cross-sectional view of the main configuration of a stepping motor shown in FIG. 6 and periphery thereof.

FIG. 6 is a schematic view of a timepiece (e.g., a wristwatch) including the stepping motors according to the embodiment in an exemplary arrangement. FIG. 7 is a cross-sectional view of the main configuration of a stepping motor and periphery thereof installed in the timepiece.

The timepiece 500 according to the embodiment is, for example, an analog timepiece that indicates time with the rotary hands 501 (e.g., a second hand, a minute hand, and an hour hand). The hands 501 are illustrated with broken lines in FIG. 6.

With reference to FIG. 6, the timepiece 500 according to the embodiment includes the timepiece case 510, which is composed of a metal and/or a synthetic resin.

The timepiece case 510 accommodates a timepiece module (not shown) including the stepping motors 100 and the gear train mechanisms connected thereto, and the hands 501 to be rotated by the timepiece module. The timepiece module is covered with a dial and a windshield composed of a transparent glass, for example. In FIG. 6, the dial and the windshield are not depicted to show the arrangement of the stepping motors 100.

FIG. 6 illustrates an exemplary timepiece case 510 accommodating three stepping motors 100 (100a, 100b, and 100c). It is noted that the number of stepping motors 100 installed in a single timepiece case 510 should not be limited to three, i.e., may be one, two, four, or more.

With reference to FIG. 7, each stepping motor 100 and the gear train mechanism including the gears 502 connected thereto are disposed between the base board 505 and a gear receiver 506. The gear receiver 506 holds the stepping motor 100 mounted on the base board 505 against the base board 505.

The stepping motors 100 are fixed onto the base board 505 with the screws 507, as described above.

FIG. 8 is a plan view of the base board 505 from which the stepping motors 100 are removed.

With reference to FIG. 8, the surface of the base board 505 has, for example, shallow recesses, each defining the outline of the corresponding stepping motor 100 to indicate a proper position of the stepping motor 100.

The base board 505 according to the embodiment further has positioners 508 corresponding to the outer notches 24 of the respective stators 2 of the stepping motors 100.

The positioners 508 are composed of protrusions that can fit in the respective outer notches 24.

The number and the arrangement of the positioners 508 should not be limited to the illustrated example, provided that each positioner 508 corresponds to either one of the outer notches 24 and the inner notches 25. For example, the positioner 508 may have a shape fittable in one of the inner notches 25. Alternatively, the base board 505 may have a pair of positioners 508 for a single stepping motor 100 such that the positioners 508 can fit in the two respective outer notches 24 or the two respective inner notches 25. Each positioner 508 may have any shape other than the illustrated example, provided that the positioner 508 can fit in one of the outer notches 24 and the inner notches 25 to position the stepping motor 100. For example, the positioner 508 may have a thin shape like a pin.

The stator 2 according to the embodiment is reversible, and the reversal of the stator 2 can reverse the rotational direction of the rotor 1, as described above. If the positioners 508 are disposed on the base board 505 onto which the stepping motors 100 are to be mounted, as illustrated in FIGS. 6 and 8, the reversed stator 2 (i.e., the stepping motor 100 including the reversed stator 2) is blocked by each positioner 508 and cannot be mounted onto the base board 505. The positioner 508 determines the orientation (front side up or back side up) of the mounted stator 2 and thus can avoid erroneous assembly.

In an example illustrated in FIG. 6, for the stepping motors 100a and 100b in the three stepping motors 100 (100a, 100b, and 100c) accommodated in the timepiece case 510, the positioners 508 position the stators 2 in the orientation as illustrated in FIG. 1A, so that the rotors 1 rotate clockwise. In contrast, for the stepping motor 100c, the positioner 508 positions the stator 2 in the orientation as illustrated in FIG. 3A, so that the rotor 1 rotates counterclockwise.

The base board 505 further has shaft holes 509 to receive the rotary shafts 11 of the stepping motors 100 and shafts of the gears 502 of the gear train mechanisms.

The operations of the stepping motor 100 according to the embodiment and the timepiece 500 including the stepping motor 100 will now be explained.

According to the embodiment, in order to assemble the stepping motor 100 that includes a rotor 1 rotating clockwise, the stator 2 is disposed at a predetermined position on the base board 505 such that the outer notches 24 reside at the upper-left and lower-right positions whereas the inner notches 25 reside at upper-left and lower-right positions, like the stepping motor 100a or 100b in FIG. 6. The positioner 508 fits in one of the outer notches 24 to position the stator 2 with a proper orientation.

In order to assemble the stepping motor 100 that includes a rotor 1 rotating counterclockwise, the stator 2 is disposed at a predetermined position on the base board 505 such that the outer notches 24 reside at the upper-right and lower-left positions whereas the inner notches 25 reside at upper-right and lower-left positions, like the stepping motor 100c in FIG. 6. The positioner 508 fits in one of the outer notches 24 to position the stator 2 with a proper orientation.

The coil block 3 is disposed on the positioned stator 2. The substrate 5 is then placed on one of the coil-side couplers 312 of the coil block 3 (the left coil-side coupler 312 in FIG. 6 in the embodiment) with the spacer 5a therebetween.

The substrate 5, the coil block 3, and the stator 2 are fixed onto the base board 505 with the screws 507. This process completes the assembly of the stepping motor 100 and the installation of the stepping motor 100 into the timepiece case 510.

For the stepping motor 100 rotating a hand 501 of a timepiece (e.g., the timepiece 500 in FIG. 6), the gears 502 of the gear train mechanism are interposed between the rotary shaft 11 of the stepping motor 100 and the hand 501 to transmit the torque of the rotor 1 to the hand 501.

Under driving pulses applied to the coil 32 of the stepping motor 100 (e.g., the stepping motor 100a or 100b in FIG. 6) that includes the stator 2 having the upper-left and lower-right outer notches 24 and the upper-left and lower-right inner notches 25, the rotor 1 rotates clockwise by a predetermined step angle inside the rotor accommodating hole 23. Under driving pulses applied to the coil 32 of the stepping motor 100 (e.g., the stepping motor 100c in FIG. 6) that includes the stator 2 having the upper-right and lower-left outer notches 24 and the upper-right and lower-left inner notches 25, the rotor 1 rotates counterclockwise by a predetermined step angle inside the rotor accommodating hole 23.

The gears 502 engaging with the pinion 12 provided at the rotary shaft 11 rotate in response to the rotation of the rotor 1. The torque of the rotor 1 is transmitted to the hand 501, and the hand 501 rotates by a predetermined angle.

The outer notches 24 according to the embodiment are disposed on the outer periphery of the stator 2 on the opposite sides of the rotor accommodating hole 23, such that the line that connects the respective narrowest portions between the outer notches 24 and the rotor accommodating hole 23 and extends through the center of the rotor accommodating hole 23 shifts by a predetermined angle (e.g., 17°) from the line that extends through the center of the rotor accommodating hole 23 and is orthogonal to the extending direction of the stator 2, as described above.

If the outer notches 24 were disposed on the line that extends through the center of the rotor accommodating hole 23 and is orthogonal to the extending direction of the stator 2, the stator 2 might have narrow portions adjacent to the positions of saturated magnetic fluxes (portions 26) depending on the positions of the inner notches 25. The magnetic fluxes generated from the coil core 31 would be readily saturated at the narrow portions before reaching the positions of saturated magnetic fluxes (portions 26) in the stator 2. This configuration would cause energy loss. If the width of the stator 2 (the width orthogonal to the extending direction of the stator 2) was narrowed by the miniaturization of the stepping motor 100, the magnetic fluxes would be more readily saturated before reaching the positions of saturated magnetic fluxes. The energy loss would accordingly increase. In contrast, the positions of the outer notches 24 according to the embodiment are shifted from the line that extends through the center of the rotor accommodating hole 23 and is orthogonal to the extending direction of the stator 2, such that the outer notches 24 are not disposed at the narrowest portions between the rotor accommodating hole 23 and the outer periphery of the stator 2. The stator 2 through which the magnetic fluxes generated from the coil core 31 flow has a cross section gently decreasing to the positions of saturated magnetic fluxes in the stator 2, regardless of the narrowed width of the stator 2 because of the miniaturization of the stepping motor 100. Thus, the magnetic fluxes are barely saturated before reaching the positions of saturated magnetic fluxes, resulting in less energy loss. This configuration can effectively utilize the magnetic force generated from the coil 32 for the 360° rotation of the rotor 1.

According to the embodiment, the rotor accommodating hole 23 is disposed at the center of the stator 2 in its extending direction, and the stator 2 has an identical thickness at both sides in the extending direction. The stator 2 has a substantially symmetrical shape and a substantially identical thickness at both sides in the extending direction of the stator 2 (the right and left in FIG. 1A), so that the reversed stator 2 can accept the coil block 3, as illustrated in FIGS. 1A, 3A, and 6. The side of the stator 2 to accept the coil block 3 can determine the clockwise or counterclockwise rotation of the rotor 1. In other words, the mere reversal of the stator 2 having the same shape can reverse the rotational direction of the rotor 1. This configuration can reduce the types of components to be manufactured, leading to increased productivity and reduced costs for the production and stock of the components.

In the stepping motor 100, if the thickness or the shape of the stator 2 was asymmetric in its extending direction, the rotor 1 (magnet) and the right and left connections (couplers) between the stator 2 and the coil core 31 (i.e., the thickest magnetically permeable portions in the stepping motor 100) would generate asymmetric magnetic force between the right and left. The rotary shaft 11 of the rotor 1 would thus be attracted by one side of the stator 2, leading to an increase in the friction. This phenomenon would increase the holding torque (index torque) and lead to asymmetric holding force on the rotary shaft 11 upon the rotation of the rotor 1. The friction occurring at the rotary shaft 11 would thus increase, resulting in more energy loss.

In order to rotate the rotor 1 with less energy loss as efficiently as possible, the right and left connections (couplers) between the stator 2 and the coil core 31 (i.e., the thickest magnetically permeable portions in the stepping motor 100) should be equally distant from the rotor 1 (magnet) for equalization of the generated magnetic force between the right and left. In specific, the further miniaturization of the stepping motor 100 would remarkably reduce the distances between the rotor 1 (magnet) and the respective connections (couplers) between the stator 2 and the coil core 31, so that the magnetic relationships between the rotor 1 and the respective couplers and the resulting energy loss could not be ignored. In contrast, the thickness and the shape of the stator 2 according to the embodiment are symmetric in its extending direction. This configuration can reduce the friction occurring at the rotary shaft 11 and reduce the holding torque (index torque). The holding force on the rotary shaft 11 upon the rotation of the rotor 1 is equalized between the right and left, so that the friction occurring at the rotary shaft 11 is cancelled between the right and left. This configuration can effectively rotate the rotor 1 with less energy loss.

The connections (couplers) between the stator 2 and the coil core 31 have the same magnetic force as that of the rotor accommodating hole 23 of the stator 2; hence, the rotor 1 (magnet) may have the same thickness as those of the connections (couplers) between the stator 2 and the coil core 31.

The stepping motor 100 according to the embodiment can effectively operate with less energy loss even if the stepping motor 100 is miniaturized, as described above. A small timepiece 500, such as a wristwatch, including the stepping motors 100 can thus be reduced in size and weight.

According to the embodiment, the base board 505 of the timepiece 500 has the positioners 508 corresponding to the outer notches 24 or the inner notches 25 of the stators 2 of the stepping motors 100. The stepping motors 100 each include the reversible stator 2, and the reversal of the stator 2 can reverse the rotational direction of the rotor 1. The positioners 508 can readily and certainly position such stepping motors 100 with a desired orientation, to improve the efficiency of the assembly while maintaining its accuracy.

Second Embodiment

A stepping motor according to a second embodiment of the invention and a timepiece including the stepping motor will now be described with reference to FIGS. 9A and 9B, FIGS. 10A and 10B and FIG. 11. The second embodiment differs from the first embodiment only in the configurations of the couplers of the stator and the coil block. The following description focuses on the differences from the first embodiment.

Figure 9A:
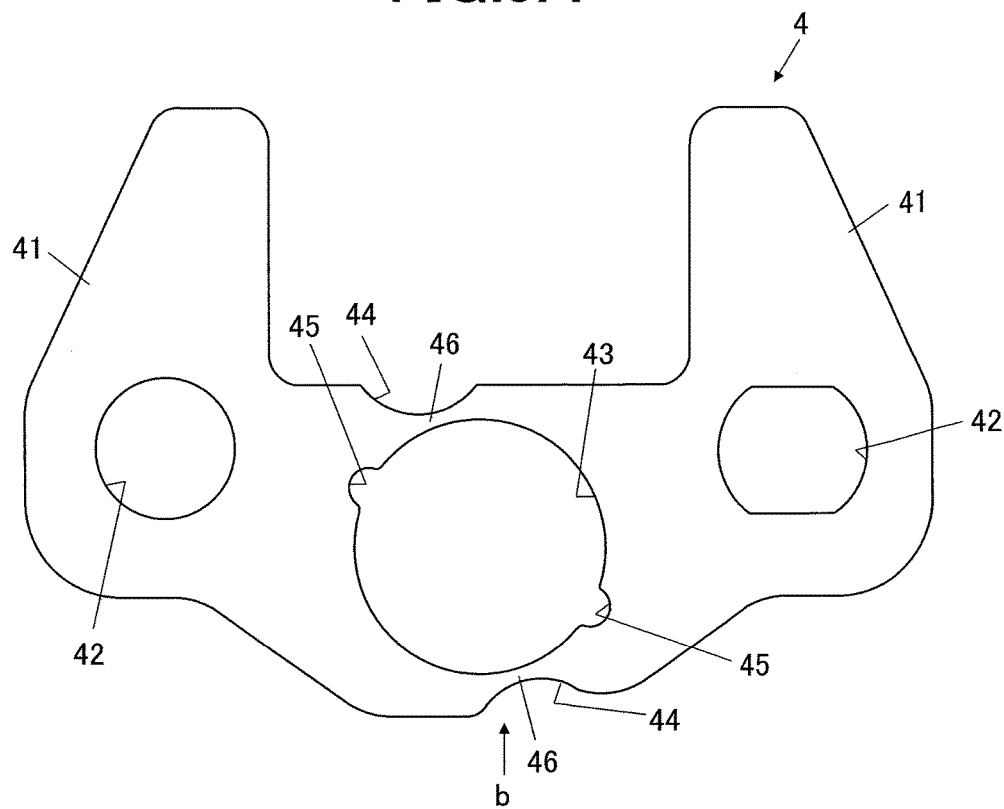
FIG. 9A is a plan view of a stator according to a second embodiment.
Figure 9B:
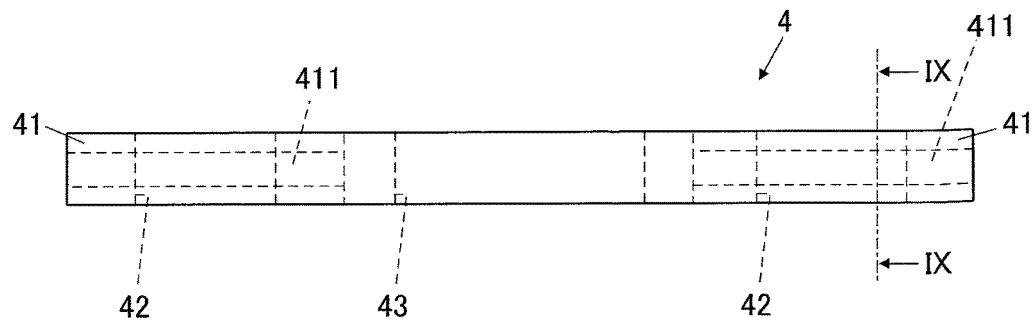
FIG. 9B is a side view of the stator when seen in the direction of an arrow b in FIG. 9A.
Figure 10A:
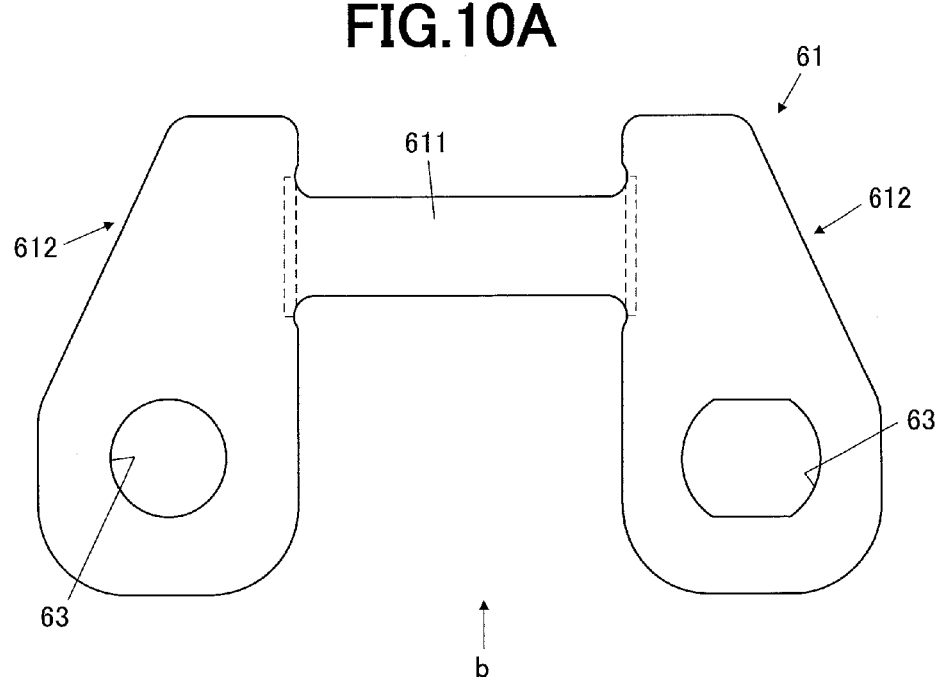
FIG. 10A is a front view of a coil core according to the second embodiment.
Figure 10B:
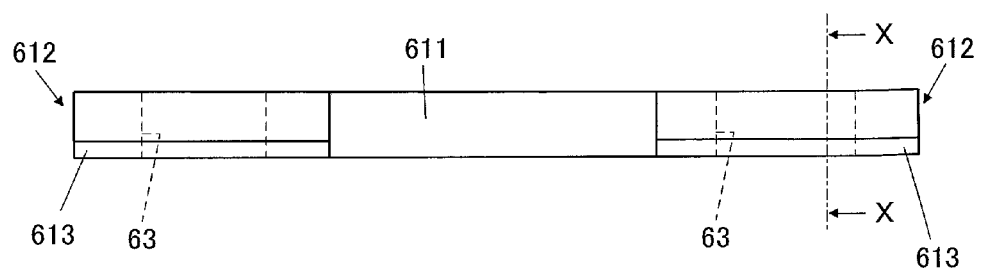
FIG. 10B is a side view of the coil core when seen in the direction of an arrow b in FIG. 10A.
Figure 11:
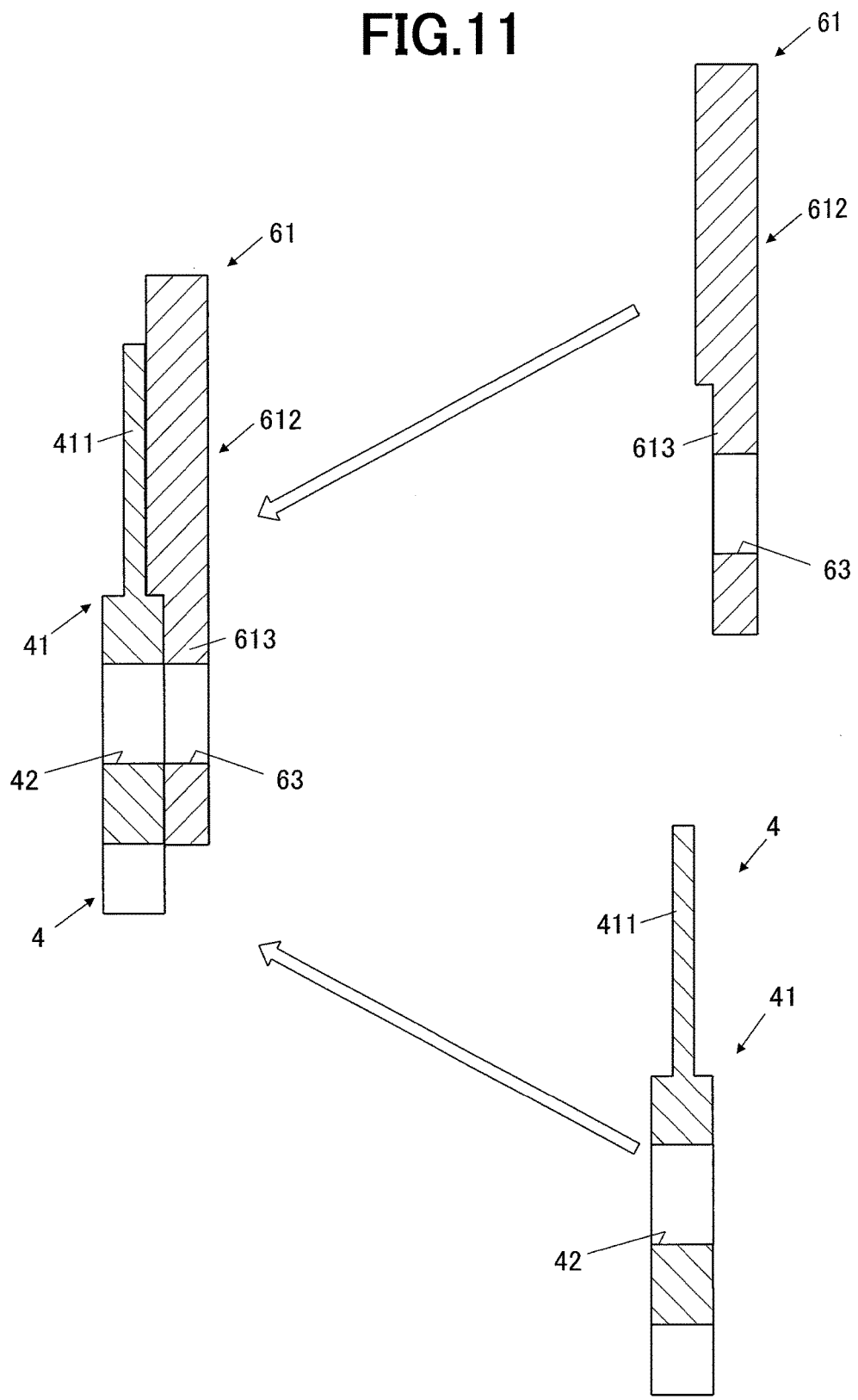
FIG. 11 is a diagram illustrating an assembly of the stator having a cross section along a line IX-IX in FIG. 9 and the coil core having a cross section along a line X-X in FIG. 10.

FIG. 9A is a plan view of a stator according to the second embodiment, and FIG. 9B is a side view of the stator when seen in the direction of the arrow b in FIG. 9A. FIG. 10A is a front view of a coil core according to the embodiment, and FIG. 10B is a side view of the coil core when seen in the direction of the arrow b in FIG. 10A. FIG. 11 is a diagram illustrating an assembly of the stator having a cross section along the line IX-IX in FIG. 9 and the coil core having a cross section along the line X-X in FIG. 10.

With reference to FIGS. 9A and 9B, a stator 4 according to the second embodiment includes stator-side couplers 41 having screw holes 42, a rotor accommodating hole 43, outer notches 44, inner notches 45, and portions 46 of saturated magnetic fluxes, just like the first embodiment.

With reference to FIGS. 10A and 10B, a coil core 61 according to the second embodiment includes a linear portion 611 and coil-side couplers 612 having screw holes 63, just like the first embodiment.

The stator 4 adjoins the coil core 61 through the stator-side couplers 41 and the coil-side couplers 612.

According to the second embodiment, free ends of the stator-side couplers 41 are thinned from the front and rear surfaces into thin portions 411 thinner than the rest of the portions of the stator-side couplers 41, as illustrated in FIG. 9B and the lower right of FIG. 11. The stator 4 according to the embodiment also has a substantially symmetrical shape and a substantially identical thickness at both sides in the extending direction of the stator 4 (the right and left in FIG. 9A). The free ends of the stator-side couplers 41 are thinned by substantially the same depth from the front and rear surfaces, such that the front and rear surfaces of the stator 4 have substantially the same shape.

With reference to FIG. 10B and the upper right of FIG. 11, free ends of the coil-side couplers 612 are thinned from the front surface into thin portions 613 thinner than the rest of the portions of the coil-side couplers 612.

With reference to FIG. 11, the coil-side couplers 612 are provided on the stator-side couplers 41, such that the thin portions 411 of the stator-side couplers 41 adjoin the respective rest of the portions of the coil-side couplers 612 whereas the thin portions 613 of the coil-side couplers 612 adjoin the respective rest of the portions of the stator-side couplers 41.

Such stacked couplers have a smaller thickness compared to that of the stacked couplers having no thin portion.

For example, if each stator-side coupler 41 and each coil-side coupler 612 have the same thickness and have no thin portion, the stacked couplers have a thickness of the sum of the stator-side coupler 41 and the coil-side coupler 612, i.e., twice (six-thirds) of the original thickness of a single coupler.

In another example illustrated in FIG. 11, each stator-side coupler 41 is thinned by a depth of one-third of the original thickness from the front and rear surfaces into the thin portion 411 having a thickness of one-third of that of the rest of the portion, whereas each coil-side coupler 612 is thinned by a depth of one-third of the original thickness from the front surface into the thin portion 613 having a thickness of two-thirds of that of the rest of the portion. In this case, with reference to the left of FIG. 11, the thin portion 411 of the stator-side coupler 41 combined with the rest of the portion of the coil-side coupler 612 has a thickness of four-thirds of the original thickness, whereas the thin portion 613 of the coil-side coupler 612 combined with the rest of the portion of the stator-side coupler 41 has a thickness of five-thirds of the original thickness. In other words, both of the resulting thicknesses are smaller than the thickness of the sum of the original stator-side coupler 41 and coil-side coupler 612, i.e., six-thirds of the original thickness of a single coupler.

The thin portion 411 of the stator-side coupler 41 and the thin portion 613 of the coil-side coupler 612 each may have any thickness other than the illustrated example. One or both of the thin portions may have an even smaller thickness.

The other components are identical to those in the first embodiment, and the redundant description thereof is omitted.

The operations of the stepping motor according to the second embodiment and the timepiece including the stepping motor will now be explained.

In order to assemble the stepping motor according to the embodiment that includes a rotor rotating clockwise, the stator 4 is disposed at a predetermined position on the base board such that the outer notches 44 reside at upper-left and lower-right positions whereas the inner notches 45 reside at upper-left and lower-right positions. The positioner fits in one of the outer notches 44 to position the stator 4 with a proper orientation.

In order to assemble the stepping motor that includes a rotor rotating counterclockwise, the stator 4 is disposed at a predetermined position on the base board such that the outer notches 44 reside at upper-right and lower-left positions whereas the inner notches 45 reside at upper-right and lower-left positions. The positioner fits in one of the outer notches 44 to position the stator 4 with a proper orientation.

The coil block is disposed on the positioned stator 4. In specific, the coil-side couplers 612 are provided on the stator-side couplers 41, such that the thin portions 411 of the stator-side couplers 41 adjoin the rest of the portions of the coil-side couplers 612 whereas the thin portions 613 of the coil-side couplers 612 adjoin the rest of the portions of the stator-side couplers 41.

The substrate is then placed on one of the coil-side couplers 612 of the coil block. The substrate, the coil block, and the stator 4 are fixed onto the base board with screws. This process completes the assembly of the stepping motor and the installation of the stepping motor into a timepiece case.

The other operations are identical to those in the first embodiment, and the redundant explanation thereof is omitted.

As described above, the second embodiment can provide the same advantageous effects as the first embodiment and additional advantageous effects below.

According to the second embodiment, the stator 4 adjoins the coil core 61 through the stator-side couplers 41 and the coil-side couplers 612. At least part of the stator-side couplers 41 of the stator 4 constitutes the thin portions 411 thinner than the rest of the stator-side couplers 41, whereas at least part of the coil-side couplers 612 constitutes the thin portions 613 thinner than the rest of the coil-side couplers 612.

This configuration can reduce the thickness of the stacked couplers of the stator 4 and the coil core 61, leading to miniaturization of the stepping motor.

The reduction in the thickness of the stacked couplers of the stator 4 and the coil core 61 can reduce the influence of the connections (couplers) between the stator 4 and the coil core 61 (i.e., the thickest magnetically permeable portions in the stepping motor) on the rotor (magnet), so that the rotor can more effectively rotate.

According to the embodiment, the stator-side couplers 41 and the coil-side couplers 612 both have thin portions (411 and 613). This configuration can further reduce the thickness of the couplers.

If the stator-side couplers 41 are thinned by the same depth from the front and rear surfaces as in the embodiment, the front and rear surfaces of the stator 4 have the same shape; hence, the mere reversal of the stator 4 in the stepping motor can reverse the rotational direction of the rotor, just like the first embodiment.

Although the stator-side couplers 41 and the coil-side couplers 612 have thin portions (411 and 613) in the second embodiment, the thin portions are not essential for both the stator-side couplers 41 and the coil-side couplers 612. For example, the thin portions may be provided to only the coil-side couplers 612.

If the stator-side couplers 41 have no thin portion, the stator 4 that has the same shape on the front and rear surfaces and thus is reversible can be readily manufactured.

Although the process (thinning process) for thinning part of the couplers may impair the motor characteristics of the stepping motor, the impairment can be minimized because the portions wider than the linear portion 611 wound with a wire in the coil core 61 are thinned into the thin portions 613. In addition, if the stator 4 composed of Permalloy C having a low saturation flux density is not thinned (squeeze processing), the impairment of the motor characteristics can be further minimized.

Third Embodiment

A stepping motor according to a third embodiment of the invention and a timepiece including the stepping motor will now be described with reference to FIGS. 12A to 12D. The third embodiment differs from the first embodiment mainly in the configuration of the coil core. The following description focuses on differences from the first embodiment.

Figure 12A:
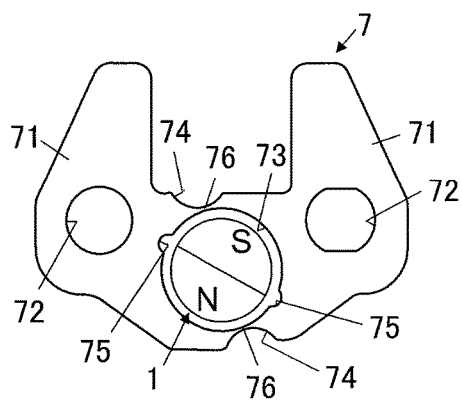
FIG. 12A is a plan view of a stator and a rotor according to a third embodiment.
Figure 12B:
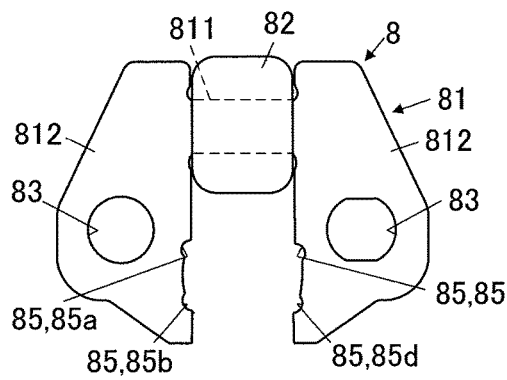
FIG. 12B is a plan view of a coil block according to the third embodiment.
Figure 12C:
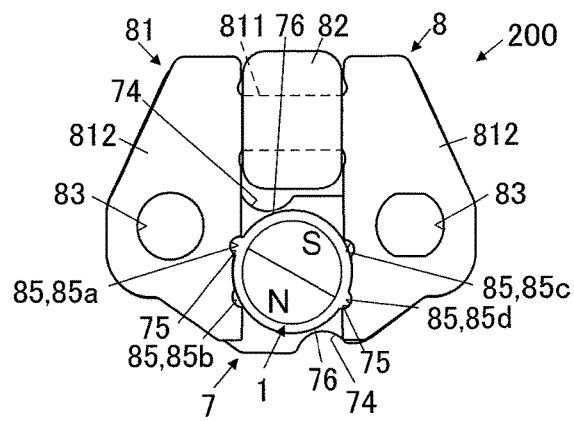
FIG. 12C is a front view of a stepping motor according to the third embodiment where the rotor thereof rotates clockwise.
Figure 12D:
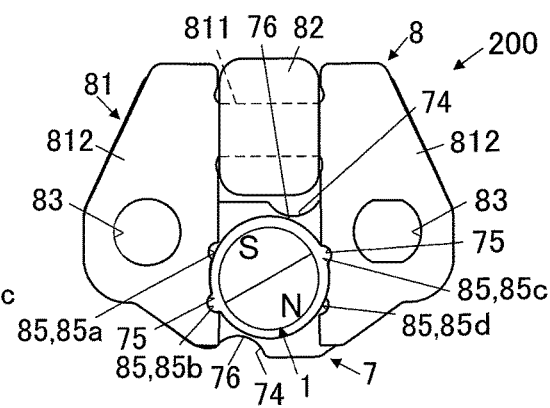
FIG. 12D is a front view of the stepping motor in FIG. 12C where the rotor thereof rotates counterclockwise.

FIG. 12A is a plan view of a stator and a rotor according to the third embodiment, FIG. 12B is a plan view of a coil block according to the embodiment, FIG. 12C is a front view of a stepping motor according to the embodiment that includes the rotor rotating clockwise, and FIG. 12D is a front view of the stepping motor in FIG. 12C that includes the rotor rotating counterclockwise.

With reference to FIG. 12A, a stator 7 according to the third embodiment includes stator-side couplers 71 having screw holes 72, a rotor accommodating hole 73, outer notches 74, inner notches 75, and portions 76 of saturated magnetic fluxes, just like the first embodiment.

With reference to FIG. 12B, a coil block 8 according to the third embodiment includes a coil core 81 including a linear portion 811 and coil-side couplers 812 having screw holes 83, and a coil 82 composed of a wire wound around the linear portion 811 of the coil core 81, just like the first embodiment.

According to the embodiment, the coil core 81 has notches 85 at positions corresponding to the respective inner notches 75 of the stator 7.

In specific, the coil core 81 has four notches 85 (85a, 85b, 85c, and 85d) on the inner sides of the coil-side couplers 812, such that two of the notches 85 are disposed over the inner notches 75 when the coil-side couplers 812 are provided on the stator 7, according to the embodiment. The notches 85 each may have any shape other than the illustrated example. The shape of the notch 85 does not necessarily need to completely match the corresponding inner notch 75. For example, the notch 85 may be slightly larger than the corresponding inner notch 75.

The stator 7 according to the embodiment is reversible, just like the first embodiment. The notches 85 of the coil core 81 are effective regardless of the orientation of the mounted stator 7.

In order to rotate the rotor 1 clockwise, as illustrated in FIG. 12C, the stator 7 is disposed such that the outer notches 74 reside at upper-left and lower-right positions whereas the inner notches 75 reside at upper-left and lower-right positions. In this case, the notches 85a and 85d of the four notches 85 in the coil core 81 correspond to the respective inner notches 75. In other words, when the coil block 8 is provided on the stator 7, the notches 85a and 85d are disposed over the respective inner notches 75 of the stator 7.

In order to rotate the rotor 1 counterclockwise, as illustrated in FIG. 12D, the stator 7 is disposed such that the outer notches 74 reside at upper-right and lower-left positions whereas the inner notches 75 reside at upper-right and lower-left positions. In this case, the notches 85b and 85c of the four notches 85 in the coil core 81 correspond to the respective inner notches 75. In other words, when the coil block 8 is provided on the stator 7, the notches 85b and 85c are disposed over the respective inner notches 75 of the stator 7.

The other components are identical to those in the first embodiment, and the redundant description thereof is omitted.

The operations of the stepping motor 200 according to the third embodiment and the timepiece including the stepping motor 200 will now be explained.

In order to assemble the stepping motor 200 according to the embodiment that includes a rotor 1 rotating clockwise, the stator 7 is disposed at a predetermined position on the base board such that the outer notches 74 reside at the upper-left and lower-right positions whereas the inner notches 75 reside at the upper-left and lower-right positions. The positioner fits in one of the outer notches 74 to position the stator 7 with a proper orientation.

The coil block 8 is provided on the positioned stator 7. In specific, the coil block 8 is disposed such that the notches 85a and 85d of the four notches 85 in the coil core 81 reside over the respective inner notches 75 of the stator 7.

In order to assemble the stepping motor 200 that includes a rotor 1 rotating counterclockwise, the stator 7 is disposed at a predetermined position on the base board such that the outer notches 74 reside at the upper-right and lower-left positions whereas the inner notches 75 reside at the upper-right and lower-left positions. The positioner fits in one of the outer notches 74 to position the stator 7 with a proper orientation.

The coil block 8 is provided on the positioned stator 7. In specific, the coil block 8 is disposed such that the notches 85*b* and 85*c* of the four notches 85 in the coil core 81 reside over the respective inner notches 75 of the stator 7.

The substrate is then placed on one of the coil-side couplers 812 of the coil block 8. The substrate, the coil block 8, and the stator 7 are fixed onto the base board with screws. This process completes the assembly of the stepping motor 200 and the installation of the stepping motor 200 into a timepiece case.

The other operations are identical to those in the first embodiment, and the redundant explanation thereof is omitted.

As described above, the third embodiment can provide the same advantageous effects as the first embodiment and additional advantageous effects below.

According to the third embodiment, the coil core 81 has the notches 85 (85*a*, 85*b*, 85*c*, and 85*d*) at positions corresponding to the respective inner notches 75 of the stator 7.

In general, if the width (in the lateral direction in FIG. 12C) of the stepping motor 200 is reduced by the miniaturization of the stepping motor 200, the coil-side couplers 812 of the coil core 81 approach the rotor accommodating hole 73 of the stator 7, so that the coil-side couplers 812 overlap the inner notches 75 of the stator 7.

In this case, the rotor 1 (magnet) is significantly close to the connections (couplers) between the stator 7 and the coil core 81. The connections (couplers) between the stator 7 and the coil core 81 are the thickest magnetically permeable portions; hence, the connections close to the rotor 1 significantly influence the rotor 1.

If the coil core 81 also has notches 85 corresponding to the respective inner notches 75 as in the embodiment, the rotor 1 can stably stop at a certain stationary position.

The coil-side couplers 812 of the coil core 81 are close to the rotor accommodating hole 73 of the stator 7 such that the coil-side couplers 812 overlap the inner notches 75 of the stator 7 in the embodiment. Alternatively, the stator 7 and the coil core 81 may have any positional relationship other than the illustrated example.

Even if the coil-side couplers 812 do not overlap the inner notches 75 of the stator 7, the connections (couplers) between the stator 7 and the coil core 81 (i.e., the thickest magnetically permeable portions in the stepping motor 200) may influence the rotor 1. The influence of the connections (couplers) between the stator 7 and the coil core 81 on the rotor 1 can be effectively reduced with notches at positions corresponding to the inner notches 75.

The invention should not be limited to the embodiments described above, and the embodiments may be modified in various manners within the gist of the invention.

For example, although the timepiece is an analogue timepiece 500 that indicates time with rotary hands in the embodiments, the timepiece may also be of any type other than the analogue type.

For example, the timepiece may be capable of both digital and analog display.

The stepping motor 100 may drive any functional indicator, such as a date indicator, other than the hands. If the stepping motor 100 drives a functional indicator, the timepiece may be a digital timepiece including a display (e.g., a liquid crystal display) for displaying various pieces of information, such as time and calendar.

The timepiece may be a pocket watch or a watch with a key chain attachable to and detachable from a bag, other than the wristwatch.

Although the stepping motor 100 is applied to the timepiece 500 (e.g., a wristwatch) in the embodiments, the stepping motor 100 may also be applied to any device other than the timepiece.

For example, the stepping motor 100 or 200 according to the embodiments may drive hands and/or functional indicators of a pedometer, pulse rate meter, altimeter, or barometer.

The invention is not intended to be limited to the embodiments described above but rather is defined by the following claims and equivalents thereof.

The entire disclosure of Japanese Patent Application No. 2013-201949 filed on Sep. 27, 2013 including description, claims, drawings, and abstract are incorporated herein by reference in its entirety.

What is claimed is:

1. A stepping motor, comprising:
a rotor;
a stator which comprises:
   a rotor accommodating hole to accommodate the rotor;
   a pair of outer notches to determine positions of saturated magnetic fluxes; and
   inner notches disposed on an inner periphery of the stator around the rotor accommodating hole, the inner notches determining stably stationary positions of the rotor; and
a coil block configured by a coil wound around a coil core which is magnetically coupled to the stator,
wherein:
   the outer notches are disposed on an outer periphery of the stator on opposite sides of the rotor accommodating hole,
   a line that connects narrowest portions between the outer notches and the rotor accommodating hole and extends through a center of the rotor accommodating hole is shifted by a predetermined angle from a line that extends through the center of the rotor accommodating hole and is orthogonal to an extending direction of the stator,
   the coil core comprises:
      a linear portion around which a wire is wound to form the coil; and
      coil-side couplers which are disposed at both ends of the linear portion and which extend to both sides along a direction orthogonal to an extending direction of the linear portion;
   the coil core includes a thinner portion which has a smaller thickness than a thickness of the linear portion at at least a part of the coil-side couplers, and
   the coil core is magnetically coupled to the stator via the thinner portion.

2. The stepping motor according to claim 1, wherein:
the rotor accommodating hole is disposed at a center of the stator in the extending direction of the stator, and
the stator has an identical thickness at both sides in the extending direction of the stator.

3. The stepping motor according to claim 1, wherein the coil core has notches at positions corresponding to the inner notches of the stator.

4. The stepping motor according to claim 1, wherein:
the stator further comprises stator-side couplers,
the stator-side couplers adjoin the coil-side couplers so as to overlap, and at least part of the stator-side couplers has a smaller thickness than a thickness of the rest of the stator-side couplers.

5. A timepiece, comprising:
a stepping motor which comprises:
   a rotor;
   a stator including:
      a rotor accommodating hole to accommodate the rotor;
      a pair of outer notches to determine positions of saturated magnetic fluxes; and
      inner notches disposed on an inner periphery of the stator around the rotor accommodating hole, the inner notches determining stably stationary positions of the rotor; and
   a coil block configured by a coil wound around a coil core which is magnetically coupled to the stator,
hands; and
a gear train mechanism which is coupled with the hands and which is driven by rotation of the stepping motor, wherein:
   in the stepping motor, the outer notches are disposed on an outer periphery of the stator on opposite sides of the rotor accommodating hole, and a line that connects narrowest portions between the outer notches and the rotor accommodating hole and extends through a center of the rotor accommodating hole is shifted by a predetermined angle from a line that extends through the center of the rotor accommodating hole and is orthogonal to an extending direction of the stator,
   the coil core comprises:
      a linear portion around which a wire is wound to form the coil; and
      coil-side couplers which are disposed at both ends of the linear portion and which extend to both sides along a direction orthogonal to an extending direction of the linear portion;
   the coil core includes a thinner portion which has a smaller thickness than a thickness of the linear portion at at least a part of the coil-side couplers, and
   the coil core is magnetically coupled to the stator via the thinner portion.

6. The timepiece according to claim 5, further comprising a base board provided under the stepping motor,
   wherein the base board comprises a positioner corresponding to one of the outer notches and/or the inner notches of the stator of the stepping motor.

\* \* \* \* \*